March 24, 1964 L. W. SCHMIDT 3,126,062
FOLIAGE DEFLECTING UNIT
Filed Jan. 7, 1963 2 Sheets-Sheet 1

INVENTOR.
Lewis W. Schmidt
Webster & Webster
ATTYS.

March 24, 1964   L. W. SCHMIDT   3,126,062
FOLIAGE DEFLECTING UNIT

Filed Jan. 7, 1963

United States Patent Office 3,126,062
Patented Mar. 24, 1964

3,126,062
FOLIAGE DEFLECTING UNIT
Lewis Wallace Schmidt, 130 N. 6th St., Rio Vista, Calif., assignor to Lloyd K. Schmidt, Albert M. Jongeneel, Lewis W. Schmidt, and Claude A. Loucks, each sixteen percent; George C. Gordon and Ernest F. Blackwelder, each ten percent; Mrs. Jessie Newell, eight percent; Pliny G. Holt, Frank H. Holt, Richard E. Holt, Harriet H. Shelton, Frank A. Guernsey, and Darius A. Guernsey, each one and one-third percent
Filed Jan. 7, 1963, Ser. No. 249,620
9 Claims. (Cl. 171—42)

The present invention relates to a foliage deflecting unit for an agricultural implement, particularly a row crop harvester.

In harvesting, where there is profuse foliage on the row crop, the harvester is commonly provided with transversely spaced cutting discs or coulters disposed ahead of the harvesting mechanism and working on opposite sides of the row to sever the foliage which of itself is in the paths of such coulters; the purpose being to reduce the amount of foliage to which the harvesting mechanism is subjected when removing the crop from the ground.

The coulters alone, however, cannot sever the foliage which upstands between the paths of such coulters, and which upstanding foliage frequently impairs the effectiveness of or clogs the harvesting mechanism.

It is therefore the major object of this invention to provide, in a row crop harvester and ahead of the coulters, a novel foliage deflecting unit which functions to longitudinally part or separate the upstanding foliage, and to deflect the same—in opposite directions—laterally outwardly and downwardly to adjacent the ground and into the paths of the coulters for severing thereby. In this way, and as is desirable, a much greater proportion of the foliage is cut away from the crop before the latter is reached by the harvesting mechanism.

Although not limited to such adaptation, the present foliage deflecting unit is especially designed for, and later described as used in connection with a sugar beet harvester of the type wherein the harvesting mechanism includes a spiked, beet pick-up wheel which runs on the crop row to impale the beets and then lift them from the ground, and which can be best accomplished in the absence of excessive foliage remaining on such beets.

Another important object of the invention is to provide a foliage deflecting unit which is designed for ready manufacture, and convenience of installation on a row crop harvester.

A further object of the invention is to provide a practical, reliable, and durable foliage deflecting unit, and one which will be exceedingly effective for the purpose for which it is designed.

These objects are accomplished by means of such structure and relative arrangement of parts as will fully appear by a perusal of the following specification and claims.

Figure 1:
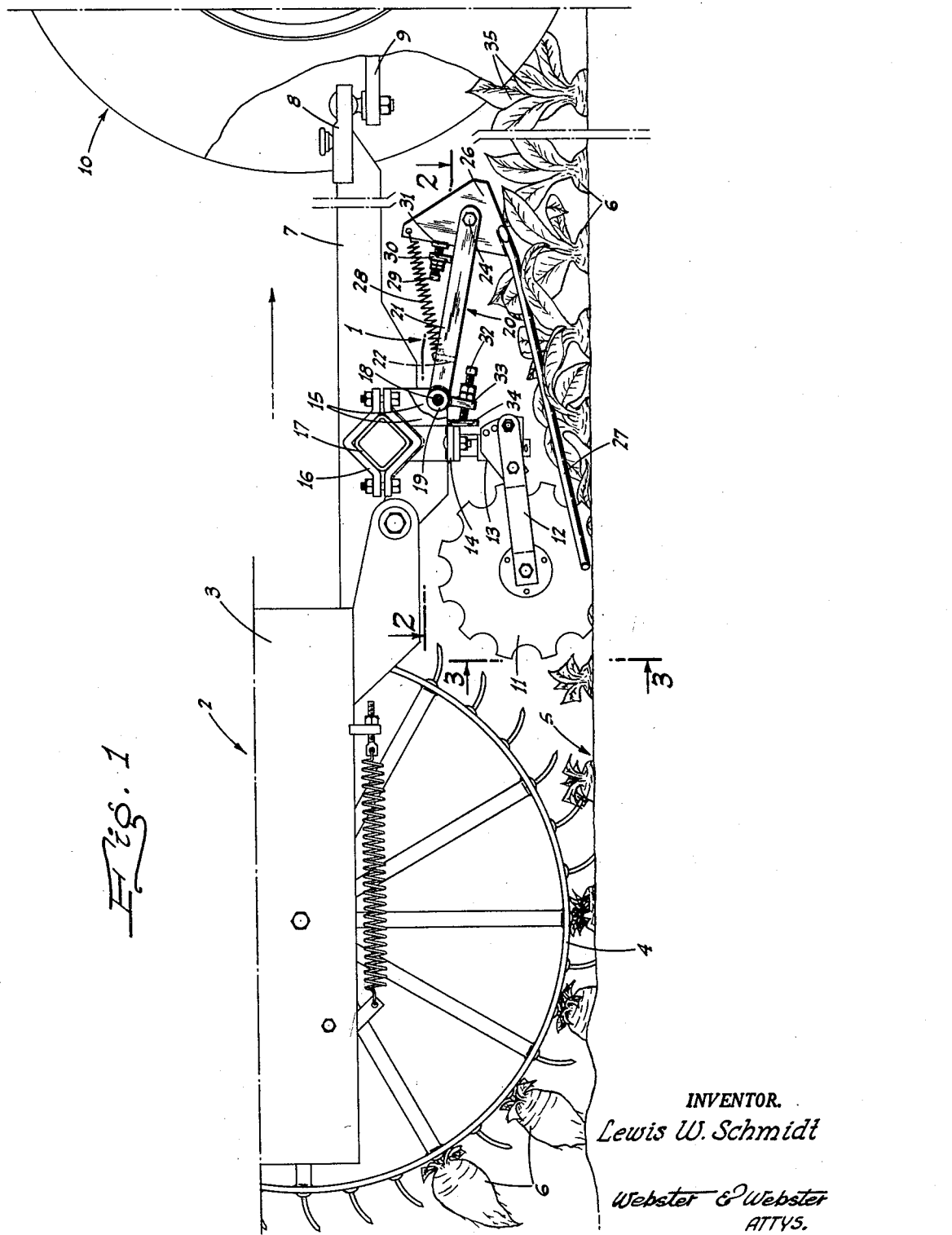
FIG. 1 is a side elevation of the foliage deflecting unit as mounted on a sugar beet harvester of the spiked, beet pick-up wheel type.
Figure 2:
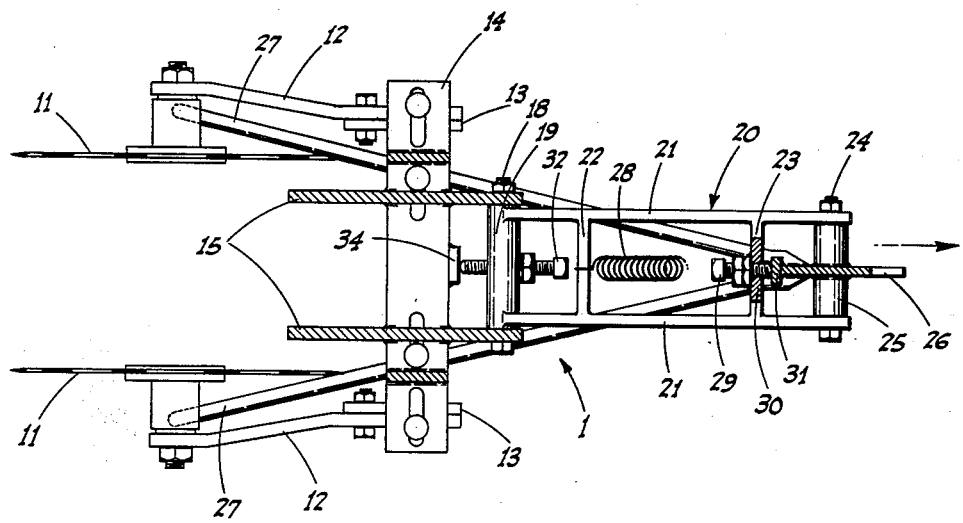
FIG. 2 is a sectional plan view on line 2—2 of FIG. 1.
Figure 3:
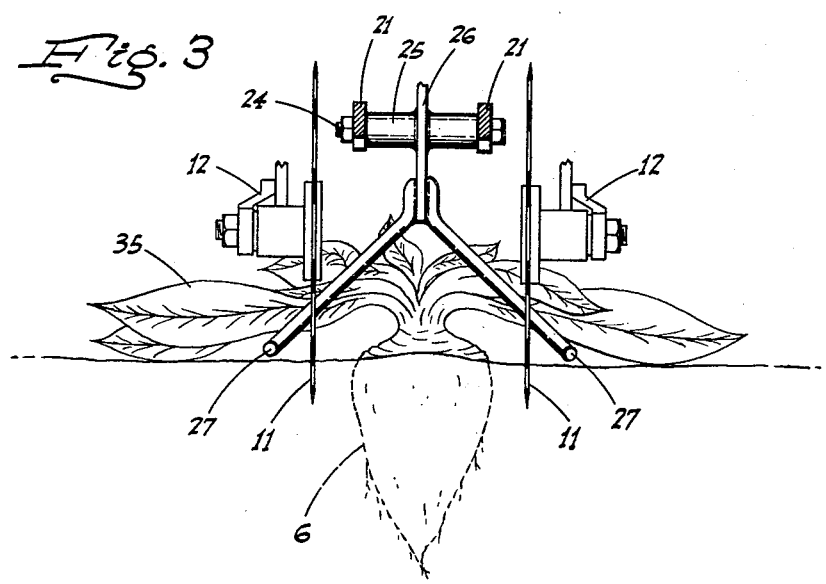
FIG. 3 is a transverse sectional elevation on line 3—3 of FIG. 1.

Referring now more particularly to the drawings, and to the characters of reference marked thereon, the foliage deflecting unit, which is indicated generally at 1 and later described in detail, is here shown as mounted in connection with a sugar beet harvester of the spiked, beet pick-up wheel type; such harvester—which is shown only in part, and somewhat diagrammatically—being indicated generally at 2.

Such beet harvester 2 is provided, on its frame 3, with a spiked, beet pick-up wheel 4 adapted to run directly on the crop row 5, whereby—as said wheel advances—to impale the beets 6 and to lift them from the ground; such beets being subsequently stripped from the wheel 4 by suitable means (not shown).

A tongue structure 7 is secured in draft relation to, and projects forwardly from, the frame 3, and at its front end such tongue structure 7 is coupled, as at 8, to the drawbar 9 of a tractor, indicated generally at 10.

Immediately in advance of the pick-up wheel 4 the harvester includes a pair of transversely spaced cutter discs or coulters 11 disposed to run, in engagement with the ground, along opposite sides of the crop row 5; such coulters 11 being journaled on the rear ends of forwardly projecting draft arms 12 adjustably secured at their front ends to mounts 13 which depend from a cross bar 14. In turn the cross bar 14 is fixed on the lower ends of transversely spaced, upstanding attachment plates 15 which—at their upper ends—carry a clamp unit 16 secured to a transverse tool bar 17 rigid with the tongue structure 7.

The foliage deflecting unit 1, and which embodies the present invention, comprises the following:

A cross bolt 18 spans between the lower front corners of the attachment plates 15, and a sleeve 19 surrounds and is turnable on such cross bolt 18; such sleeve 19 bearing at its ends against the adjacent attachment plates 15.

A longitudinally extending floating frame, indicated generally at 20, projects forwardly from the turnable sleeve 19, and such floating frame 20 includes transversely spaced, longitudinal side arms 21 fixed at their rear ends to said sleeve 19.

The side arms 21 of the floating frame 20 are connected together, in unitary relation, by cross webs 22 and 23 disposed in spaced relation intermediate the ends of said floating frame 20.

At the front end of the floating frame 20 a cross bolt 24 spans between the side arms 21 and carries a turnable sleeve 25, which bears at its ends against said side arms.

Centrally of its ends the turnable sleeve 25 projects through and is fixed in connection with an upstanding, laterally facing rocker plate 26 intermediate the upper and lower ends of the latter.

A pair of deflector rods 27 are fixed at their upper ends on the lower end of the rocker plate 26, and thence such deflector rods 27 extend in rearwardly and downwardly diverging relation to lower end terminations adjacent the ground alongside of or laterally outwardly from the corresponding coulters 11.

A tension spring 28 is connected to the upper end of the rocker plate 26, and thence extends—normally under load—downwardly and rearwardly to connection with the cross web 22 intermediate the ends of the latter.

The extent to which the rocker plate 26 and sleeve 25 can be rotated, by spring 28, about the cross bolt 24 as an axis is limited by a longitudinal stop bolt 29 threaded through an ear 30 upstanding centrally from the cross web 23; such stop bolt projecting forwardly and abutting at its forward end against a stop pad 31 fixed on the rear edge of the rocker plate 26 above the floating frame 20.

The extent to which said floating frame 20 can swing downwardly about the cross bolt 18 as an axis is limited by a longitudinal stop bolt 32 threaded through an ear 33 depending from the sleeve 19 centrally of its ends; such stop bolt 32—which projects rearwardly—being adapted to abut a stop pad 34 fixed on the cross bar 14 centrally between the plates 15.

With the stop bolts 29 and 32 first adjusted to pre-set the deflector rods 27 and the floating frame 20 to a selected operative position—as shown, for example, in FIG.

1—the foliage deflecting unit 1 functions in the following manner with advance of the beet harvester 2:

As such harvester advances, the rearwardly and downwardly diverging deflector rods 27 part or separate the beet foliage 35 in the central longitudinal vertical plane of the crop row 5, and progressively deflect the parted foliage in opposite directions; i.e., laterally outwardly and downwardly until such foliage approaches the ground, and which occurs immediately ahead of the coulters 11. Thus, with a major portion of the foliage so deflected it is severed by the coulters 11 as they move forward across such deflected foliage.

Consequently, the beets 6, as impaled and lifted by the spiked, beet pick-up wheel 4, do not have foliage remaining thereon in a quantity which would impair the proper operation of—or clog—such wheel; the result being that the harvesting operation can be conducted with greater efficiency and less difficulty than in an instance where the beets have a material amount of foliage remaining thereon.

By reason of the pivotal mounting of the rocker plate 26 on the floating frame 20 the deflector rods 27 may rise against the tension of spring 28 if working conditions so induce, but at all times said spring 28 maintains said deflector rods 27 with firm downward pressure against the foliage 35 being deflected.

Further, should any obstruction be encountered by the deflector rods 27, such as a large clod, not only may such rods swing upwardly against the tension of spring 28, but additionally the frame 20 may float upwardly; all to the end that damage to the foliage deflecting unit 1 will not occur.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. A foliage deflecting unit for a row crop harvester which includes a harvesting mechanism positioned to run on the row, and transversely spaced foliage cutters positioned to work along the sides of the row ahead of such mechanism; said foliage deflecting unit comprising
   a longitudinally extending member ahead of the cutters and above the row,
   means transversely pivoting said member at its rear end on the harvester for up and down floating motion,
   a pair of foliage deflector rods beneath said member and extending in downwardly and rearwardly diverging relation to lower end termination at the sides of the row and laterally outwardly of corresponding cutters,
   and means securing the deflector rods at their upper ends to the front end of said member.

2. A foliage deflecting unit, as in claim 1, in which the upper ends of the deflector rods are disposed substantially centrally above the row, and thence diverge symmetrically relative to said row.

3. A foliage deflecting unit, as in claim 1, including stop means associated with said member adapted to limit downward floating motion thereof.

4. A foliage deflecting unit for a row crop harvester which includes a harvesting mechanism positioned to run on the row, and transversely spaced foliage cutters positioned to work along the sides of the row ahead of such mechanism; said foliage deflecting unit comprising
   a longitudinally extending member ahead of the cutters and above the row,
   means transversely pivoting said member at its rear end on the harvester for up and down floating motion,
   a pair of foliage deflector rods beneath said member and extending in downwardly and rearwardly diverging relation to lower end termination at the sides of the row and laterally outwardly of corresponding cutters,
   means securing the deflector rods together at their upper ends in rigid unitary relation,
   and means transversely pivoting such deflector rod unit at its upper end to the front end of said member for up and down floating motion independently of the latter.

5. A foliage deflecting unit for a row crop harvester which includes a harvesting mechanism positioned to run on the row, and transversely spaced foliage cutters positioned to work along the sides of the row ahead of such mechanism; said foliage deflecting unit comprising
   a longitudinally extending member ahead of the cutters and above the row,
   means transversely pivoting said member at its rear end on the harvester for up and down floating motion,
   a pair of foliage deflector rods beneath said member and extending in downwardly and rearwardly diverging relation to lower end termination at the sides of the row and laterally outwardly of corresponding cutters,
   means securing the deflector rods together at their upper ends in rigid unitary relation,
   means transversely pivoting such deflector rod unit at its upper end to the front end of said member for up and down floating motion independently of the latter,
   and means yieldably urging the deflector rod unit downwardly about its pivotal axis.

6. A foliage deflecting unit, as in claim 5, including stop means associated with the deflector rod unit adapted to limit downward pivotal movement thereof.

7. A foliage deflecting unit for a row crop harvester which includes a harvesting mechanism positioned to run on the row, and transversely spaced foliage cutters positioned to work along the sides of the row ahead of such mechanism; said foliage deflecting unit comprising
   a longitudinally extending member ahead of the cutters and above the row,
   means transversely pivoting said member at its rear end on the harvester for up and down floating motion,
   a pair of foliage deflector rods beneath said member and extending in downwardly and rearwardly diverging relation to lower end termination at the sides of the row and laterally outwardly of corresponding cutters,
   an upstanding rocker element at the front end of said member,
   means transversely pivoting the rocker element intermediate its upper and lower ends on said member,
   the upper ends of the deflector rods being fixed to the rocker element below its pivotal axis,
   and a tension spring connected between the rocker element above its pivotal axis and a rearward point on the member.

8. A foliage deflecting unit for a row crop harvester which includes a harvesting mechanism positioned to run on the row, and transversely spaced foliage cutters positioned to work along the sides of the row ahead of such mechanism; said foliage deflecting unit comprising
   a longitudinally extending frame disposed ahead of the cutters,
   a transverse sleeve fixed on the rear of the frame,
   a harvester-mounted transverse pivot element extending through the sleeve,
   an upstanding rocker plate at the front end of the frame, a transverse sleeve fixed with the rocker plate intermediate its upper and lower ends, a transverse pivot element fixed on the frame at its front end and extending through said last named sleeve, a pair of foliage deflector rods beneath the frame and extending in downwardly and rearwardly diverging relation to lower end termination at the sides of the row and laterally outwardly of corresponding cutters, the deflector rods being fixed at their upper ends to the rocker plate below its axis, a tension spring connected between the rocker plate above its axis and a rearward point on the frame, and stop means between the frame and rocker plate adapted to limit rotation thereof under the influence of said tension spring.

9. A foliage deflecting unit, as in claim 8, with adjustable stop means between the frame at its rear end and the harvester to limit downward swinging movement of the frame without restricting upward swinging movement thereof.

References Cited in the file of this patent

UNITED STATES PATENTS 2,337,698     Walz ------------------ Dec. 28, 1943